United States Patent [19]
Yamazaki

[11] Patent Number: 5,360,080
[45] Date of Patent: Nov. 1, 1994

[54] VEHICLE VIBRATION CONTROL SYSTEM

[75] Inventor: Ichiro Yamazaki, Tokyo, Japan

[73] Assignee: Nissan Motor Company, Ltd., Yokohama City, Japan

[21] Appl. No.: 748,724

[22] Filed: Aug. 22, 1991

[30] Foreign Application Priority Data

Sep. 4, 1990 [JP] Japan ................... 2-232410

[51] Int. Cl.$^5$ .............................................. B60K 3/02
[52] U.S. Cl. .................................................. 180/300
[58] Field of Search ............... 180/300, 291, 299, 312; 248/566; 364/424.05, 431.08

[56] References Cited

U.S. PATENT DOCUMENTS

| | | | |
|---|---|---|---|
| 4,538,697 | 9/1985 | Murio et al. | 180/300 |
| 4,648,576 | 3/1987 | Matsui | 180/300 |
| 4,779,853 | 10/1988 | Sugino et al. | 180/300 |
| 5,101,929 | 4/1992 | Tobias | 180/300 |
| 5,145,156 | 9/1992 | Muramatsu et al. | 180/300 |

FOREIGN PATENT DOCUMENTS

| | | | |
|---|---|---|---|
| 61-207213 | 3/1985 | Japan | . |
| 0218428 | 2/1986 | Japan | 180/300 |
| 63-132411 | 8/1988 | Japan | . |

Primary Examiner—Richard M. Camby
Attorney, Agent, or Firm—Lowe, Price, LeBlanc & Becker

[57] ABSTRACT

The vehicle vibration control system comprises at least two spring constant adjustable engine mounting devices, an engine speed sensor, an engine vibration load sensor, and a controller. The controller controllably adjusts the dynamic spring constants of the engine mounting devices with reference to a stored table and on the basis of detected engine speed and engine load, to cancel vibration transmitted from an engine to the vehicle body via the two engine mounting devices. In the table, theoretically optimum load ratios and phase differences between the two engine mounting devices are listed on the basis of empirical transfer functions between the engine mounting devices and the vehicle body.

7 Claims, 9 Drawing Sheets

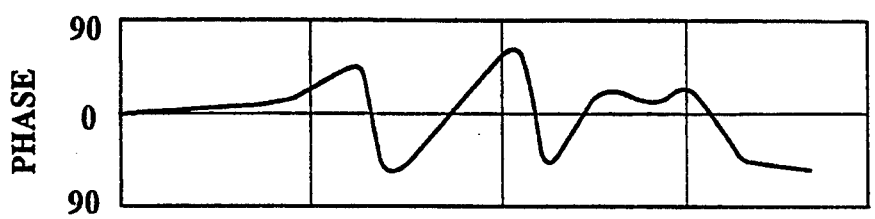
FIG.6A
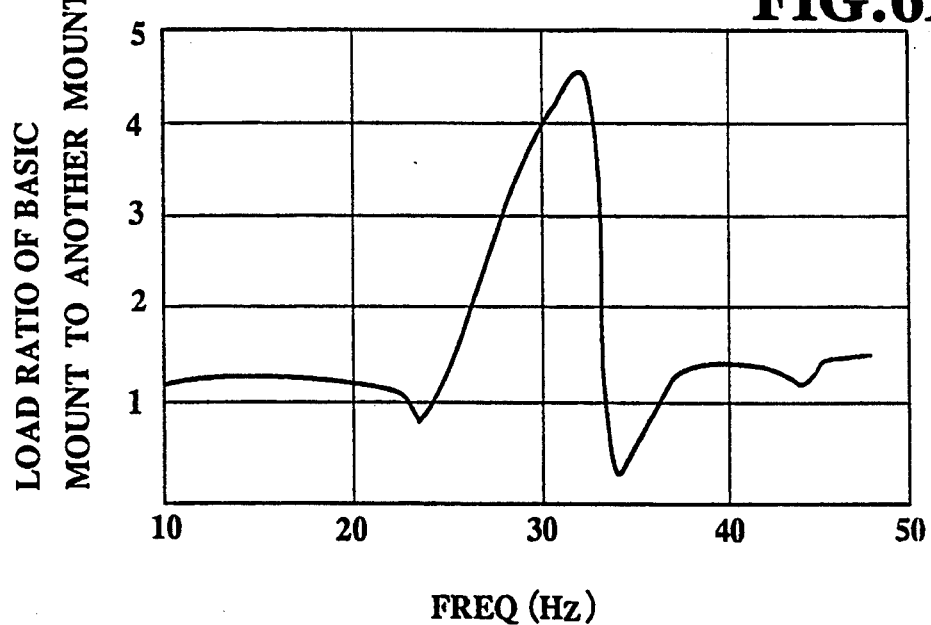
FIG.6B
FIG.7
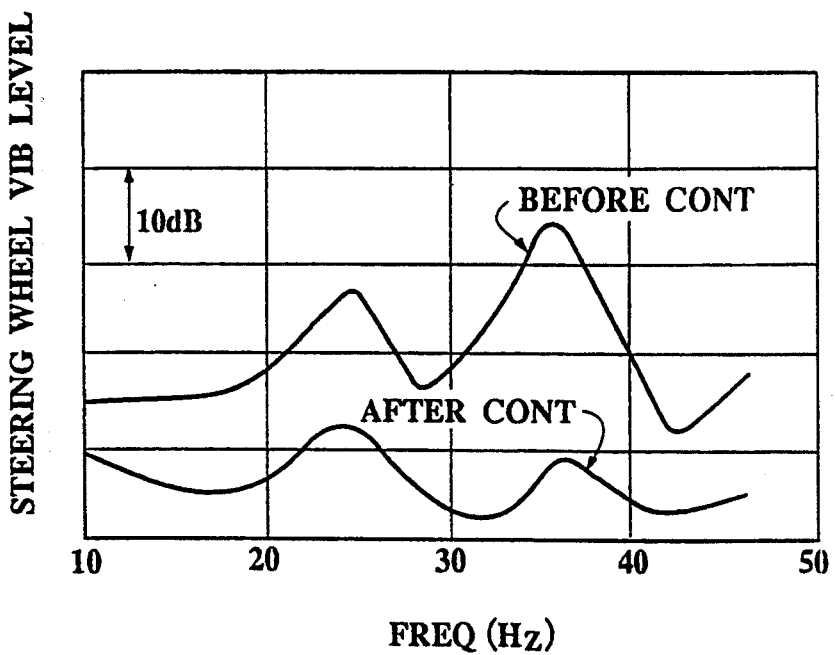

VEHICLE VIBRATION CONTROL SYSTEM

BACKGROUND OF THE INVENTION

1. Field of the Invention

The present invention relates to a vehicle vibration control system, and more specifically to a system for reducing vehicle body vibration generated by an engine.

2. Description of the Prior Art

An example of vehicle vibration control apparatus is disclosed in Japanese Published Unexamined (Kokai) Patent Appli. No. 61-207213, which comprises a vibration sensor for detecting engine or vehicle vibration; an actuator provided with a movable mass body and attached to a vehicle body via an elastic member to damp vehicle vibration; a control unit for actuating the actuator on the basis of vibration sensor signals; and a travel condition sensor. In the prior-art apparatus, the control unit commands the actuator to pass ac current through a coil to vibrate the movable mass body when the travel condition sensor detects that the vehicle is at halt, but to pass dc current through the coil to fix the movable mass body when the same sensor detects that the vehicle is travelling. Therefore, when the vehicle is at halt, since the actuator is driven by ac current, a vibration damping force corresponding to an inertia force of the movable mass body is generated and applied to the vehicle body in such a way as to cancel disturbance of torque fluctuations applied from the engine to the vehicle body or to reduce vehicle vibration. Further, when the vehicle is travelling, since the actuator is driven by dc current, the movable mass body is fixedly biased against on inner wall of the actuator by a static magnetic force generated by the dc current.

In the above-mentioned prior-art vehicle vibration control apparatus, since a large mass of about 3 to 5% of the vehicle weight is required as the movable mass body in order to effectively cancel the vehicle body vibration, there exists a problem in that the vehicle weight increases. In addition, since the vehicle vibration frequency band is composed of a plurality of frequency modes, it is impossible to effectively damp vehicle vibration by only a single actuator.

In this connection, here, an example of prior art spring constant adjustable engine mounting devices (referred to as engine mount) will be described hereinbelow with reference to FIG. 11, because these engine mounts are incorporated in the vehicle vibration control system according to the present invention.

An engine mount 3 is composed of an inner cylinder 12, an outer cylinder 14 and an elastic (rubber) body 16 interposed between these two cylinders 12 and 14. The inner cylinder 12 is attached to a vehicle body and the outer cylinder 14 is attached to an engine or vice versa to support static engine weight by the vehicle body via the elastic body 16.

The inner circumferential surface of the elastic body 16 is fixed to the inner cylinder 12, and the outer circumferential surface thereof is pressure fitted to the outer cylinder 14 via a thin rubber cylindrical member 18 fixed to the inner circumferential surface of the outer cylinder 14.

A main fluid chamber 20 and an auxiliary fluid chamber 24 are formed in the elastic body 16 with the inner cylinder 12 as a border. Further, a diaphragm 22 is formed between the auxiliary fluid chamber 24 and an inner space S of the elastic body 16 to absorb volumetric change in fluid.

A pair of opposing arcuate members 26 extending in the axial direction of the elastic body 16 are attached to the outer circumferential portion of the elastic body 16, and a cylindrical orifice forming member 28 is fitted to the thin rubber cylindrical member 18, so that a pair of orifice passages 30 and 32 can be formed between the two arcuate members 26 and the orifice forming member 28, respectively. The main fluid chamber 20 communicates with the two orifice passages 30 and 32 via two opening portions 30a and 32a and the auxiliary fluid chamber 24 communicates with the two orifice passages 30 and 32 via two other opening portions 30b and 32b.

A pair of electrode plates 34 (+) and 34a (GND) are fixed onto the arcuate member 28 and the orifice forming member 28, respectively so as to be opposed to each other within the orifice passage 30, and a pair of electrode plates 38 (+) and 36a (GND) are fixed onto the arcuate member 26 and the orifice forming member 28, respectively so as to be opposed to each other within the orifice passage 32. Further, an electro-theology fluid fills the main and auxiliary chambers 20 and 24 and the two orifice passages 30 and 32. The viscosity of the electro-rheology fluid changes according to the magnitude of electric field applied between the two pairs of opposing electrodes 34 and 34a, 36 and 36a. Therefore, the spring constant determined by the elasticity of the elastic body 16 and the viscosity of the electro-theology fluid is adjusted according to the voltage applied to the two pairs of electrodes. The above-mentioned spring constant adjustable engine mount is disclosed in Japanese Published Unexamined Utility Model Appli. No. 63-132411 in further detail, which is thereby incorporated by reference herein.

SUMMARY OF THE INVENTION

With there problems in mind, therefore, it is the primary object of the present invention to provide a vehicle vibration control system which can effectively reduce vehicle body vibration by controlling spring constants of engine mounting devices, without use of any actuators.

To achieve the above-mentioned object, the present invention provides a vehicle vibration control system for an automotive vehicle having a vehicle body and an engine, comprising: (a) at least two engine mounting means for elastically supporting the engine on the vehicle body, dynamic spring constant of each of said engine mounting means being controllable; (b) means for detecting engine speed; (c) means for detecting vibration load transmitted from the engine to the vehicle body via said engine mounting means; and (d) control means for controlling each dynamic spring constant of said engine mounting means on the basis of the detected engine speed and load, to cancel vibration caused by one engine mounting means by vibration caused by the other engine mounting means.

The at least two engine mounting means are a basic engine mounting means and at least one other engine mounting means, and said control means controls the dynamic spring constant of the other engine mounting means with reference to a stored table in which theoretically optimum load ratios and phase differences between the basic engine mounting means and the other engine mounting means are listed on the basis of empirically obtained transfer functions between the engine mounting means and at least two evaluation points on the vehicle body, and on the basis of the detected engine speed and engine vibration load transmitted via the basic engine mounting means.

Further, the present invention provides a method of controlling vehicle vibration, comprising the steps of: (a) mounting an engine on a vehicle body via a basic dynamic spring constant adjustable engine mounting device and at least one other dynamic spring constant adjustable engine mounting device; (b) empirically obtaining vibration transfer functions between the engine mounting device and at least two vibration evaluation points on a vehicle body; (c) theoretically obtaining optimum load ratios and optimum phase differences between the basic engine mounting device and the other engine mounting device on the basis of the empirically obtained transfer functions and according to vibration frequencies so that vibration level can be minimized at the vibration evaluation points; (d) storing these theoretically obtained optimum load ratios and phase differences as a table; (e) detecting engine speed; (f) reading an optimum load ratio and an optimum phase difference between the basic engine mounting device and the other engine mounting device according to the detected engine speed, from the stored table; (g) detecting a vibration load transmitted from the engine to the vehicle body via the basic engine mounting device; (h) calculating an optimum load of the other engine mounting device on the basis of the read optimum load ratio and optimum phase difference and the detected vibration load; and (i) controlling the dynamic spring constant of the other engine mounting device to cancel vibration caused by the basic engine mounting device by that caused by the other engine mounting device at the evaluation point.

In the vehicle vibration control system according to the present invention, basic engine mounting means and at least one other engine mounting means are provided, and the control means controls the dynamic spring constant of the other engine mounting means with reference to a stored table (for listing theoretically optimum load ratios and phase differences between the basic engine mounting means and the other engine mounting means on the basis of empirically obtained transfer functions between the engine mounting means and at least two evaluation points on the vehicle body) and on the basis of the detected engine speed and the detected engine vibration load (force) transmitted via the basic engine mounting means. Since no movable mass body is required, the total vehicle weight can be reduced, as compared with the prior-art method.

BRIEF DESCRIPTION OF THE DRAWINGS

FIG. 6 is a graphical representation showing theoretical load ratios and phase differences between the basic engine mount and the other engine mount, which can minimize vibration level at the steering wheel position;

FIG. 7 is a graphical representation for assistance in explaining the effect of vibration damping effect at the evaluation point before and after the dynamic spring constants of engine mounts are controlled;

DETAILED DESCRIPTION OF THE PREFERRED EMBODIMENTS

Embodiments of the vehicle vibration control system according to the present invention will be described hereinbelow with reference to the attached drawings.

Figure 1:
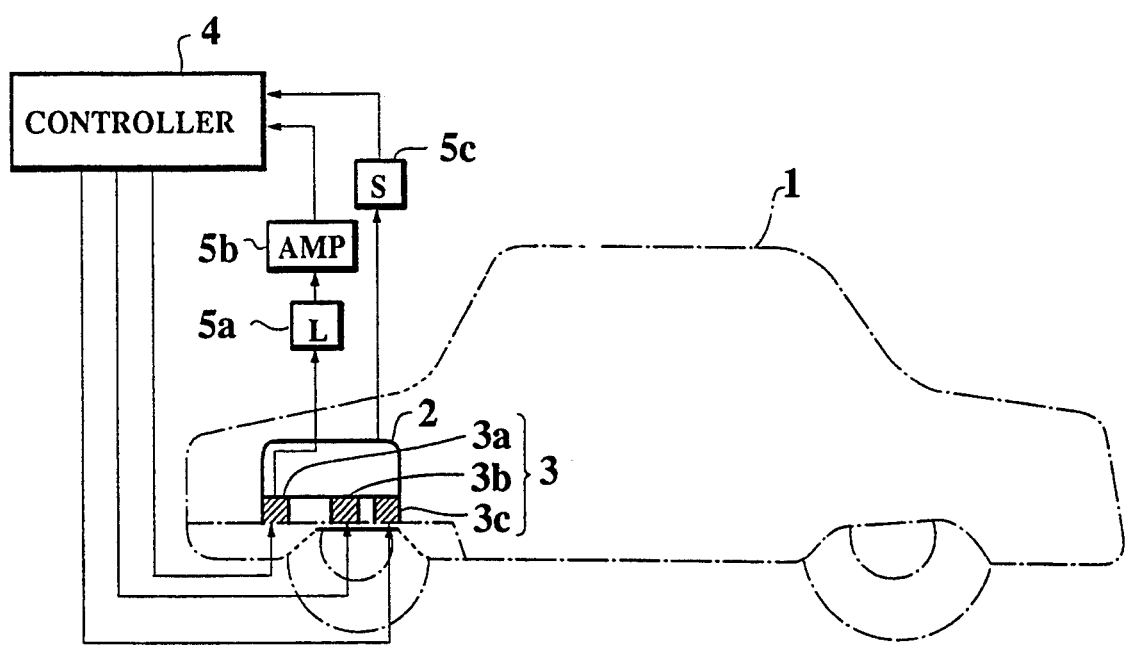
FIG. 1 is a diagrammatical illustration showing a first embodiment of the vehicle vibration control system according to the present invention.
Figure 2:
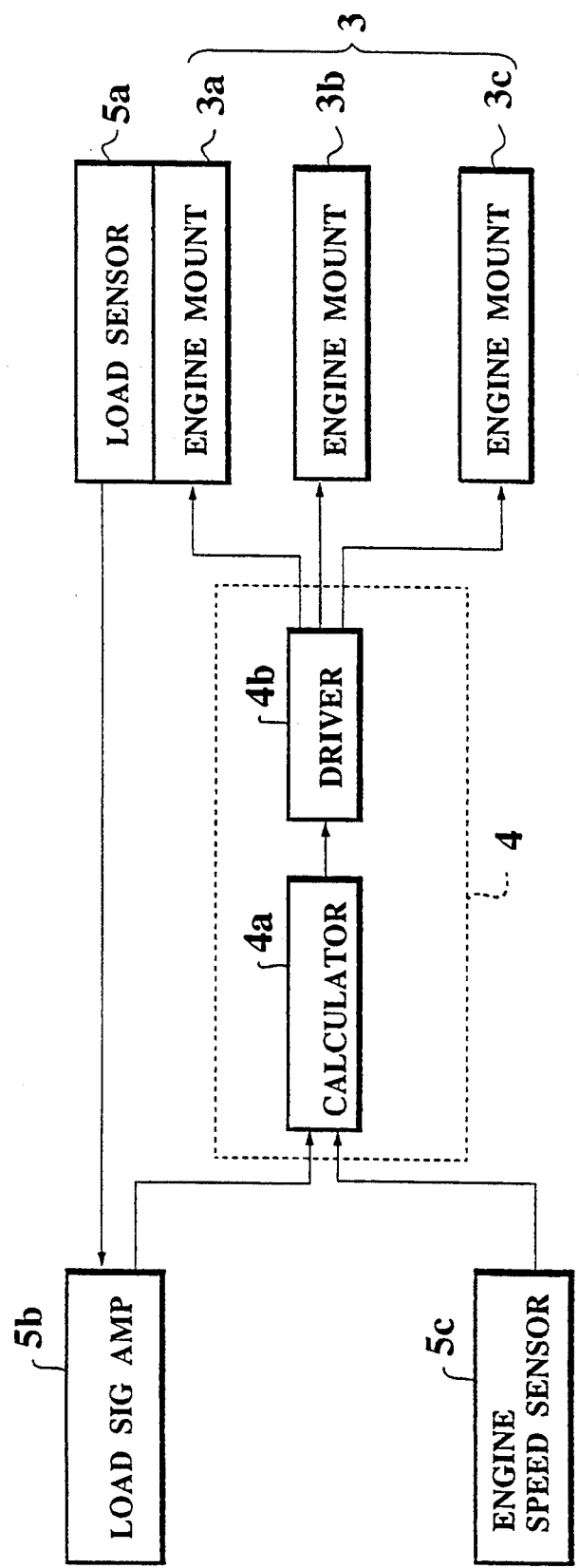
FIG. 2 is a block diagram showing a controller of the first embodiment shown in FIG. 1.

FIG. 1 is a diagrammatical illustration showing the first embodiment thereof and FIG. 2 is a block diagram showing the same. In the drawings, an engine 2 is elastically mounted on an automotive vehicle body 1 via three engine mounting devices (referred to as engine mounts, hereinafter) 3 (3a, 3b and 3c). Each engine mount is of dynamic spring constant controllable type, as already explained with reference to FIG. 11. Here, the dynamic spring constant k of an engine mount 3 can be expressed as load (force)(kg) per elongation (distance)(cm).

The control system comprises an engine speed sensor 5c attached to the engine 2, a load sensor 5a attached to a basic engine mount 3a, a load sensor amplifier 5b connected to the load sensor 5a, and a controller 4 for controlling three dynamic spring constants of engine mounts 3 so as to minimize the vehicle vibration. The engine speed sensor 5c detects engine speed on the basis of an engine ignition pulse, for instance. The load sensor 5a detects load (force) transmitted from the engine 2 to the vehicle body 1 via the basic engine mount 3a. The load signal amplifier 5b amplifies signals of the load sensor 5a and outputs the amplified signal to the controller 4.

As shown in FIG. 2, the controller 4 includes a calculator 4a and an engine mount driver 4b. The calculator 4a calculates optimum dynamic spring constants of the three engine mounts 3 on the basis the basic engine mount load detected by the load sensor 5a and engine speed detected by the engine speed sensor 5c with reference to a constant spring table stored therein. The constant spring table lists optimum load ratios and phase differences between the basic engine mount and the remaining engine mounts according to engine speed, so that vibration level at any given vibration evaluation points can be minimized by cancellation of load transmitted from different engine mounts to the evaluation points. The above list can be obtained on the basis of empirical transfer function between the engine mount 3 and the evaluation points and in accordance with the vibration theory as described later in further detail.

When the engine starts rotating, load (force) transmitted from the engine 2 to the vehicle body 1 via the basic engine mount 3a is detected by the load sensor 5a, amplified by the load sensor amplifier 5b, and then inputted to the calculator 4a. On the other hand, engine speed is detected by the engine speed sensor 5c and also inputted to the calculator 4a.

Figure 3:
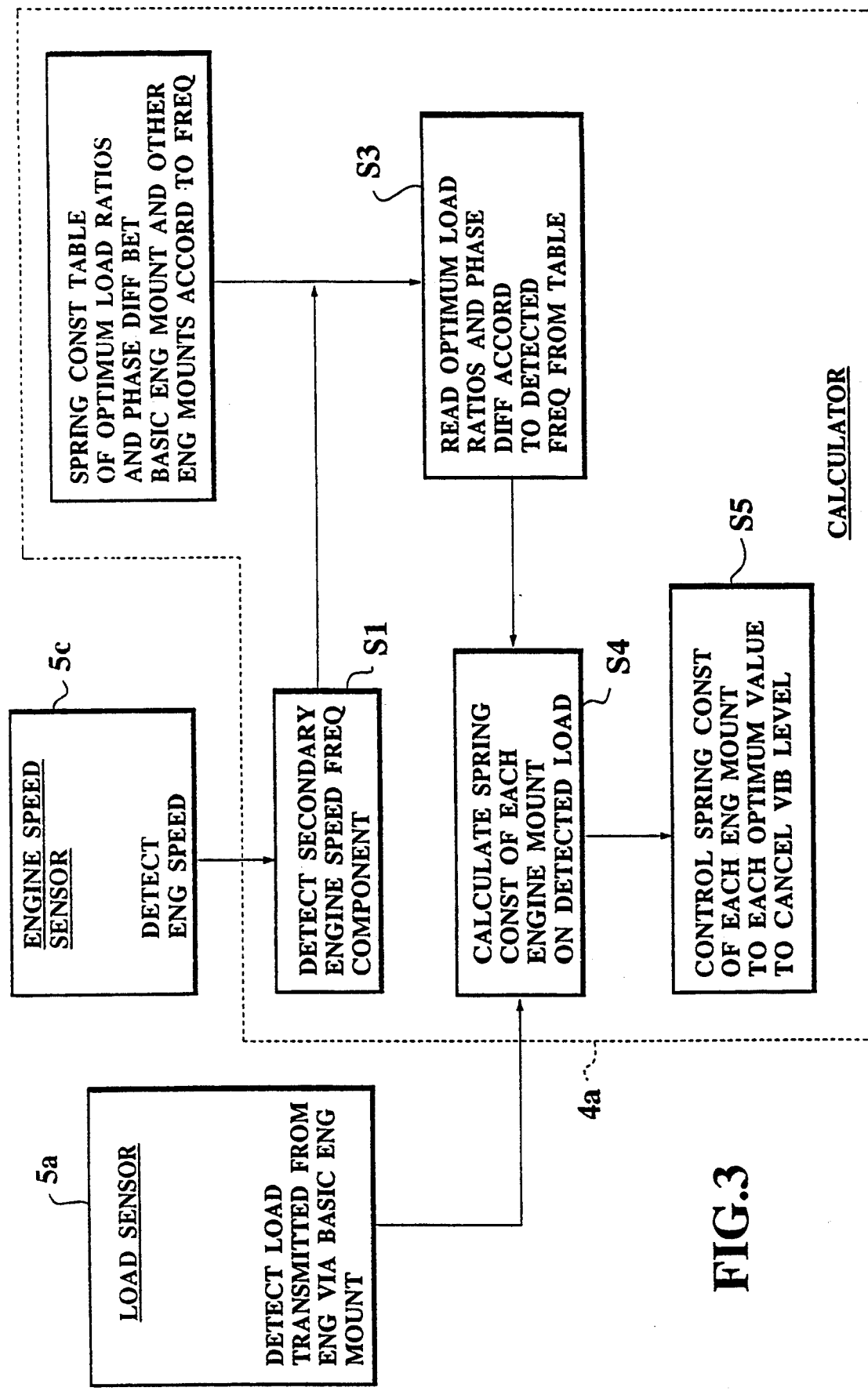
FIG. 3 is a flowchart showing a calculating procedure of the calculator shown in FIG. 2.
Figure 11:
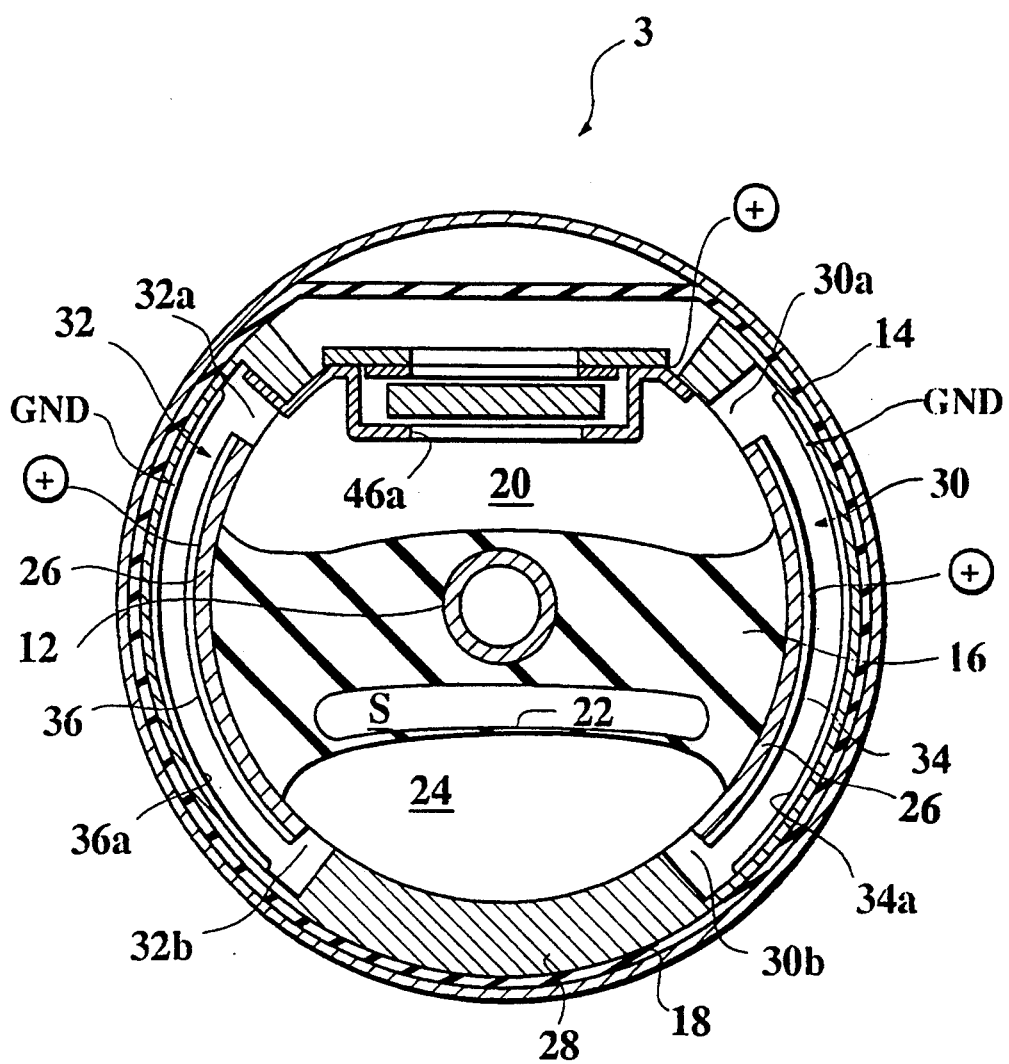
FIG. 11 is a cross-sectional view showing a prior-art spring constant adjustable engine mount incorporated in the system according to the present invention.

On the basis of these detected load and engine speed signals, the calculator 4a calculates optimum dynamic spring constants of the three engine mounts 3 in accordance with th procedure shown in FIG. 3. In more detail, calculator 4a first detects the secondary engine speed frequency (maximum in vibration components) on the basis of the signal, from the engine speed sensor 5c (in step S1), and reads the optimum transfer load ratios and phases between the basic engine mount 3a and the remaining engine mounts 3b and 3c according to the detected secondary frequency (in step S3) from a spring constant table in which optimum load ratios and phase differences among the three engine mounts are listed according to engine speed or frequency. The calculator 4a further calculates dynamic spring constants (load or force per unit elongation) of the engine mounts 3b and 3c on the basis of the load of the basic engine mount 3a detected by the load sensor 5a and amplified by the amplifier 5b so that the load ratios and phase difference between the basic engine mount 3a and the two engine mounts 3b and 3c can be optimized for cancellation of vibration loads (in step S4), and controls the dynamic spring constants of the engine mounts so as to be optimized (in step S5). The calculated optimum values are applied to the engine mounts 3 via the driver 4b, so that it is possible to minimize the vibration level at any given evaluation points on the vehicle body 1. In the case of the engine mount as shown in FIG. 11, since the viscosity of the electro-theology fluid can be controlled according to the magnitude of electric field applied to the fluid, the spring constant of the engine mount increases with increasing voltage applied to the engine mount, as already explained.

Figure 4:
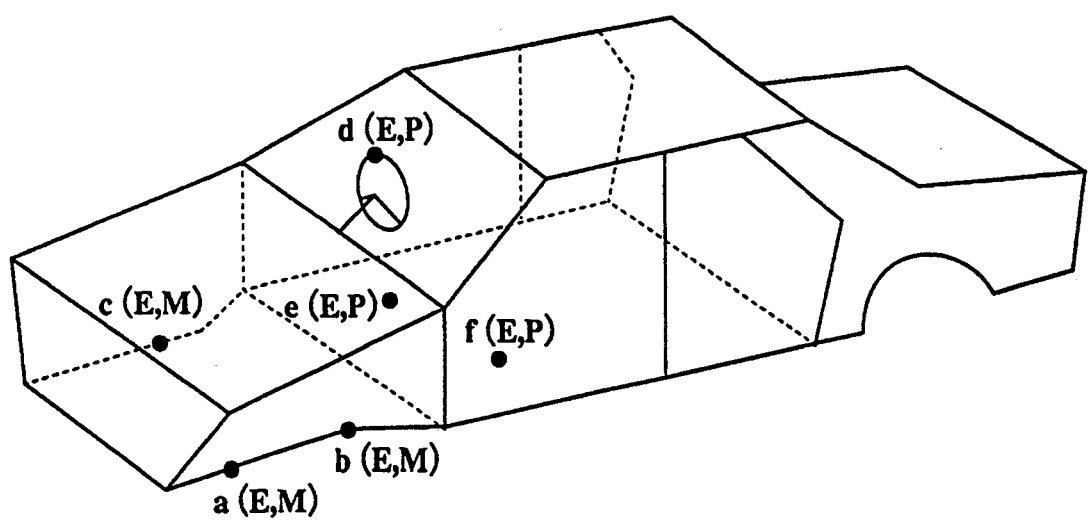
FIG. 4 is a schematic vehicle structural diagram for assistance in explaining the exemplary engine mount positions and the vibration evaluation points.

FIG. 4 shows practical positions where three engine mounts 3 are located and three evaluation points are set. That is, the three engine mounts 3a, 3b and 3c are located at three different positions a, b and c; the steering wheel evaluation point d is set on the steering wheel; and the two front floor evaluation points e and f are set on the floor below the front right and left seats. These three evaluation points d, e and f are usually adopted to evaluate vehicle vibration during engine idling.

Figure 5A:
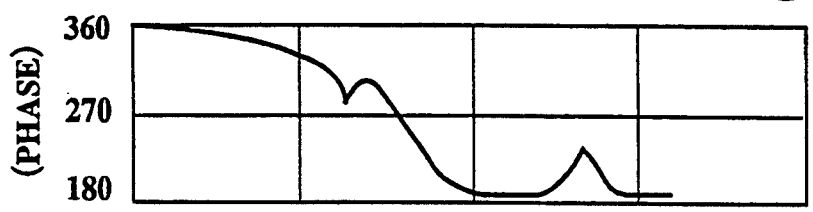
FIG. 5 is a graphical representation showing an empirical transfer function indicative of inner admittance and phase between the basic engine mount and the steering wheel position.
Figure 5B:
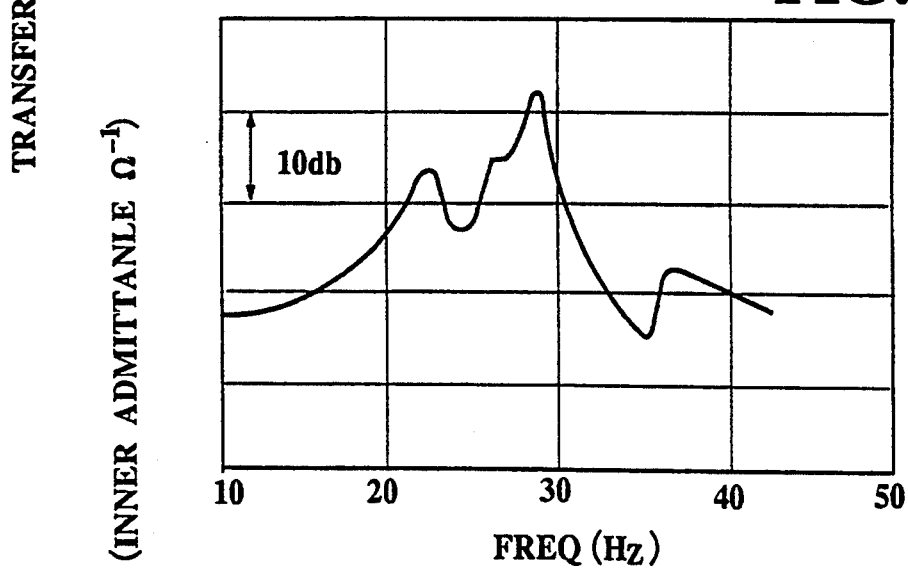

The actual vibration transfer functions from the engine mounts to the evaluation points are previously obtained by experiments. FIG. 5 shows an example of an empirical transfer function from the engine mount a to the steering wheel evaluation point d, in which inner admittance (ohm$^{-1}$) and phase are shown according to frequency. FIG. 5 indicates that the inner admittance of the transfer function between the two points a and d is maximum (i.e. the inner impedance thereof is minimum) and the phase is reversed (i.e. 180° out-of-phase between c and d) both at about 30 Hz, so that the maximum vibration is transmitted from point a to point d by a phase difference of about 180 degrees at about 30 Hz.

To cancel the above vibration transmitted from point a to point d, the engine mount 3b is so controlled that the maximum vibration can be transmitted from point b to point d by a phase difference of about 0 degrees at about 30 Hz, for instance as shown in FIG. 6. That is, the optimum load ratio and phase difference between the basic engine mount 3a and the engine mount 3b are theoretically calculated on the basis of the empirical transfer function as shown in FIG. 5 and in accordance the vibration theory (described later), in such a way that the vibration level at the evaluation point d can be minimized. In practice, load (force) transmitted from a basic engine mount a to an evaluation point d is actually measured, and other loads transmitted from other engine mounts b and c to the same evaluation point d are so controlled that the load ratios and phase differences between the basic engine mounts 3a and the remaining engine mounts 3b and 3c can cancel the vibration level at the evaluation point d.

FIG. 7 shows an example of vibration cancellation effect at the evaluation point d, in which the upper curve indicates the vibration level at point d before controlled, and the lower curve indicates the similar level at the same point d after controlled.

The theory for calculating optimum load ratio and phase difference for each engine mount will be explained hereinbelow:

The vehicle vibration is usually analyzed in accordance with modal analysis. The vibration displacement $u_1$ at an evaluation point i can be expressed as $$u_1 = \lfloor \phi_{ik} \rfloor \{\gamma_k\} \quad (1)$$

where $\phi_{ik}$ denotes the eigen mode, and $\{\gamma_k\}$ denotes the modal coordinates which can be obtained from the equation of motion represented in the modal system as $$[k_k + i\omega C_k - \omega^2 m_k]\{\gamma_k\} = \{f_k\} \quad (2)$$

where $k_k$ denotes the modal stiffness; $C_k$ denotes the modal damping; $m_k$ denotes the modal mass; and $\{f_k\}$ denotes the modal force. Here, if a load $\{F\}$ is inputted at point j, since $$\{f_k\} = [\phi_{jk}]^t\{F_j\} \quad (3)$$

when the above equations (2) and (3) are substituted for the equation (1), the following vibration displacement $u_i$ can be obtained $$u_i = \lfloor \phi_{ik} \rfloor [k_k + i\omega C_k - \omega^2 m_k]^{-1}[\phi_{jk}]^t\{F_j\} \quad (4)$$

Here, since the displacement $u_i$ is required to be minimized, the square of $u_i$ is to be minimized. The load and the transfer function (vibration equation) are divided into a real part (an upper suffix r is attached) and an imaginary part (an upper suffix i is attached) as $$[k_k + i\omega C_k - \omega^2 m_k]^{-1} = [D'] \quad (5)$$

Then, the real part of the vibration displacement $u_i$ of equation (4) is denoted by $R_e(u_i)$ and the imaginary part thereof is denoted by $I_m(u_i)$ as follows:

$$R_e(u_i) = \lfloor \phi_{ik} \rfloor [D^r][\phi_{jk}]^t\{F_{rj}\} - \lfloor \phi_{ik} \rfloor [D^i][\phi_{jk}]^t\{F_{ij}\} \quad (6)$$

$$I_m(U_i) = \lfloor \phi_{ik} \rfloor [D^r][\phi_{jk}]^t\{F_{ij}\} + \lfloor \phi_{ik} \rfloor [-D^i][\phi_{jk}]^t\{F^r\} \quad (7)$$

Further, if $$\lfloor \phi_{ik} \rfloor [D^r][\phi_{jk}]^t = \lfloor H^r \rfloor \quad (8)$$

$$\lfloor \phi_{ik} \rfloor [D^i][\phi_{jk}]^t = \lfloor H^i \rfloor \quad (9)$$

The square of the displacement $u_i^2$ can be expressed as $$u_i^2 = R_e(u_i)^2 + I_m(u_i)^2 = (\lfloor H^r \rfloor \{F_{rj}\} - \lfloor H^i \rfloor \{F_{ij}\})^2 + (\lfloor H^r \rfloor \{F_{ij}\} + \lfloor H^i \rfloor \{F_{rj}\})^2 \quad (10)$$

Since the equation (10) is an addition of two squares, the displacement at the evaluation point can be minimized when each term on the right side is minimized. That is, the following two formulae must be minimized simultaneously.

$$u_1 = (\lceil H^r_\rfloor \{F_{rj}\} - \lceil H^i_\rfloor \{F_{ij}\})^2 \qquad (11)$$

$$u_2 = (\lceil H^r_\rfloor \}F_{ij}\} + \lceil H^i_\rfloor \{F_{rj}\})^2 \qquad (12)$$

In the case of engine mounts, only the vertical direction z of an input is taken into account at the three engine mounts. Further, a load transmitted from a basic engine mount to an evaluation point on the vehicle body is assumed as the reference value as $$F_{r1} = 1.0, F_{i1} = 0.0$$

Therefore, the equations (11) and (12) become two quadratic equations including four variables.

When the equations (11) and (12) are partially differentiated to obtain a minimum value, only a single equation is obtained even if partially differentiated in any directions as $$\lceil H^r_\rfloor \{F_{rj}\} - \lceil H^i_\rfloor \{F_{ij}\} = 0 \qquad (13)$$

$$\lceil H^r_\rfloor \{F_{ij}\} + \lceil H^i_\rfloor \}F_{rj}\} = 0 \qquad (14)$$

The above equations indicate that the extreme value is always obtained as a point of intersection or a line of intersection between a curved surface represented by the equation (11) and a plane represented by the equation (13) and $u_1 = 0$ can be obtained at the intersection.

Therefore, if two evaluation points are determined, since the number of equations matches that of unknown numbers, the minimum value can be calculated to minimize the vibration displacement at the evaluation points.

Figure 8:
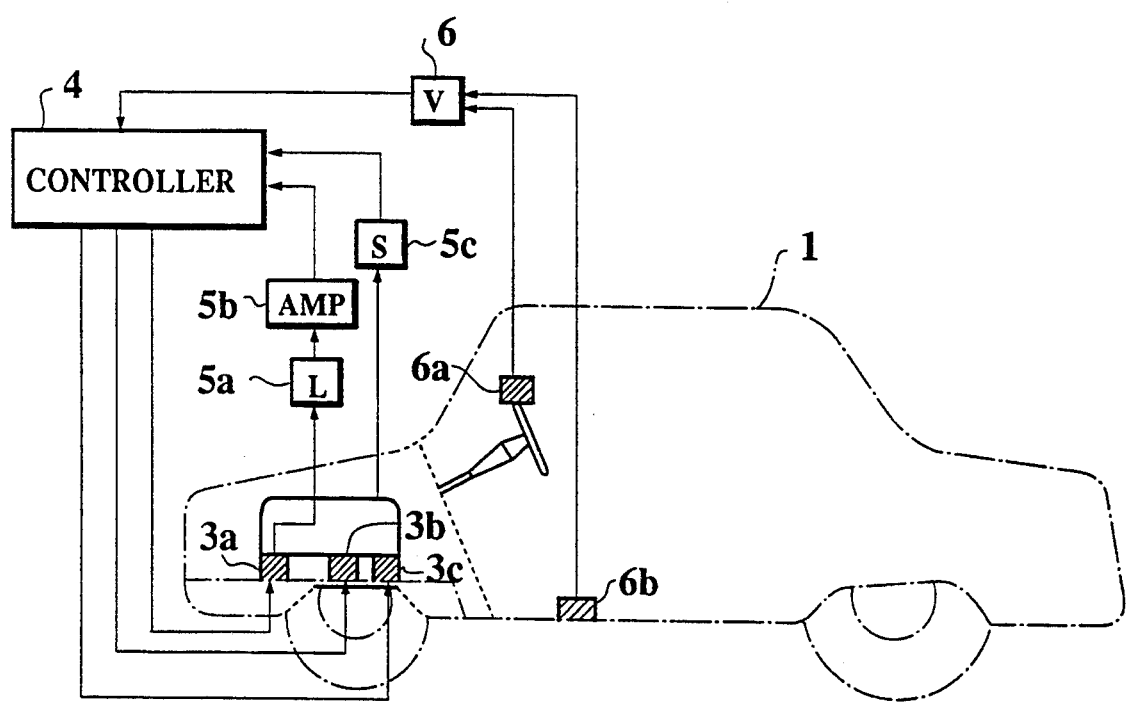
FIG. 8 is a diagrammatical illustration showing a second embodiment of the vehicle vibration control system according to the present invention.
Figure 9:
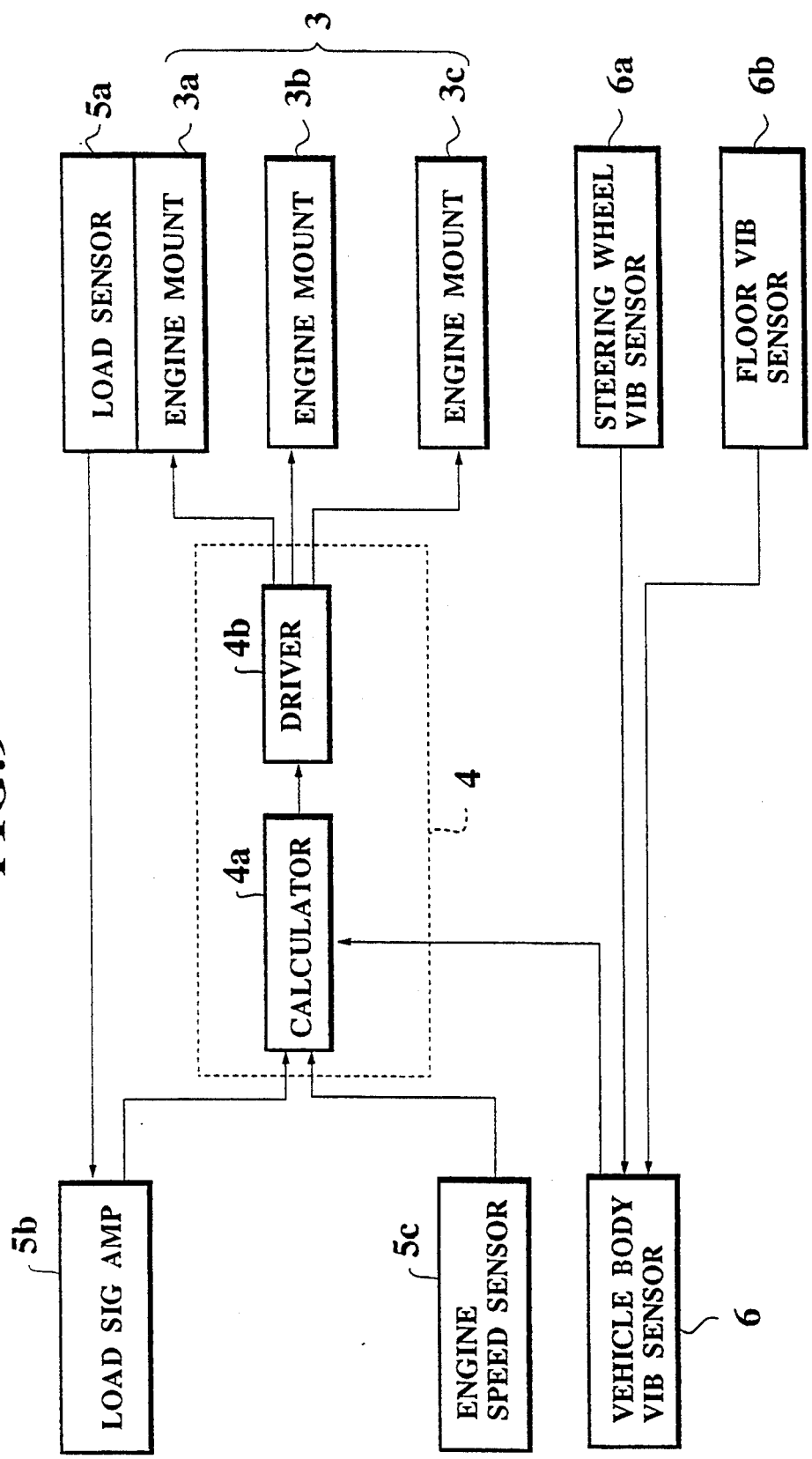
FIG. 9 is a block diagram showing a controller of the second embodiment shown in FIG. 8.

FIGS. 8 and 9 show a second embodiment of the vehicle vibration control system according to the present invention, in which a steering wheel vibration sensor 6a, a floor vibration sensor 6b, and a vehicle body vibration sensor 6 connected to the two sensors 6a and 6b are additionally provided. In this second embodiment, the transfer function transmitted from the engine mount 3a to the two evaluation points d (steering wheel) and e (floor) can be detected and updated continuously by these vibration sensors 6a and 6b. Since the updated transfer functions can be always obtained by these two vibration sensors 6a and 6b, it is possible to more securely calculate the optimum load ratios and phase differences between the basic engine mount 3a and the other engine mounts 3b and 3c on the basis of the updated transfer functions and in accordance with the afore-mentioned vibration theory. In an automatic transmission vehicle, when the select lever is shifted from Neutral to Drive range, for instance, the vibration transfer functions from the engine mounts to the evaluation points inevitably change violently. Therefore, this second embodiment is particularly preferable for an automatic transmission vehicle.

Figure 10:
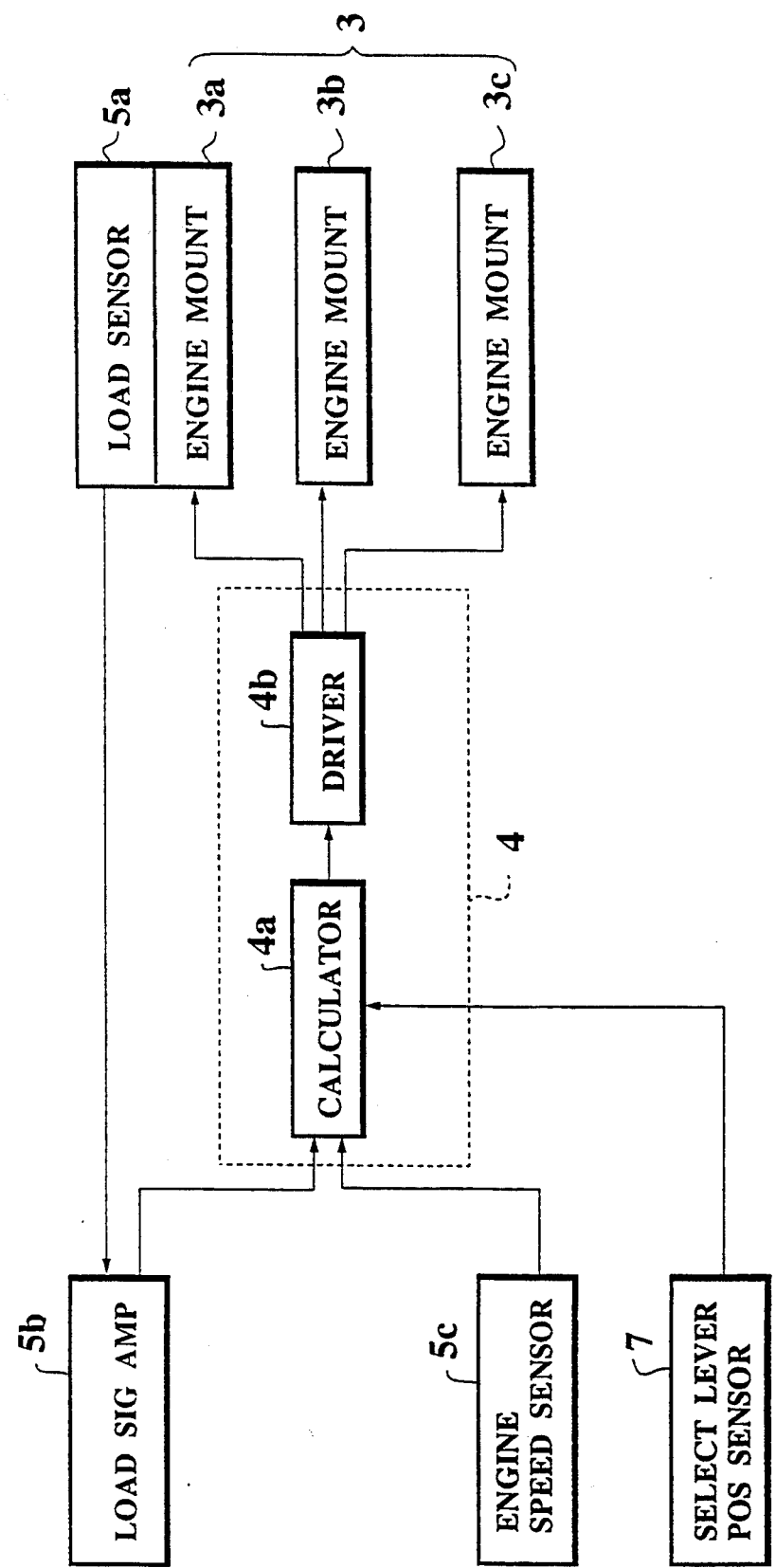
FIG. 10 is a block diagram showing a third embodiment of the control circuit.

FIG. 10 shows a third embodiment of the control system according to the present invention, in which a select lever position sensor 7 is additionally provided, instead of the vibration sensors. In this embodiment, since the transfer functions are previously calculated and stored according to the select lever positions, it is possible to obtain the similar control effect as in the second embodiment without increasing sensor cost.

As described above, in the vehicle vibration control system according to the present invention, since the actual vehicle vibration mode can be controlled by controlling the spring constants of the engine mounts so that vibration can be cancelled each other at the evaluation points on the vehicle body, vehicle body vibration due to engine can be effectively reduced, thus it being possible to improve the riding comfortability. In the present invention, since no movable mass body is required to damp the vehicle body vibration, it is possible to reduce the total vehicle weight in comparison with the conventional vibration control apparatus. In addition, since the optimum spring constants are not always or repeatedly calculated by the calculator, being different from the conventional feedback control system, it is possible to use a calculating unit relatively slow in operation speed, so that the system cost can be reduced, without deteriorating the stable performance of the vehicle vibration control system.

What is claimed is:

1. The vehicle vibration control system for an automotive vehicle having a vehicle body and an engine, comprising;
   (a) at least two engine mounting means for elastically supporting the engine on the vehicle body, dynamic spring constant of each of said engine mounting means being controllable;
   (b) means for detecting engine speed;
   (c) means for detecting vibration load transmitted from the engine to the vehicle body via said engine mounting means; and
   (d) control means for controlling each dynamic spring constant of said engine mounting means on the basis of the detected engine speed and load, to cancel vibration caused by one engine mounting means by vibration caused by the other engine mounting means,
   wherein said at least two engine mounting means are a basic engine mounting means and at least one other engine mounting means, and said control means controls the dynamic spring constant of the other engine mounting means with reference to a stored table in which theoretically optimum load ratios and phase differences between the basic engine mounting means and the other engine mounting means are listed on the basis of empirically obtained transfer functions between the engine mounting means and at a least two evaluation points on the vehicle body, and on the basis of the detected engine speed and engine vibration load transmitted via the basic engine mounting means.

2. The vehicle vibration control system of claim 1, which further comprises means for detecting vibration levels at the two vibration evaluation points, to update the previously stored empirical transfer functions.

3. The vehicle vibration control system of claim 1, which further comprises means for detecting shift lever position in an automatic transmission vehicle, to switch the previously stored empirical transfer function according to the detected shift lever position.

4. A method of controlling vehicle vibration, comprising the steps of:
   (a) mounting an engine on a vehicle body via a basic dynamic spring constant adjustable engine mounting device and at least one other dynamic spring constant adjustable engine mounting device;

(b) empirically obtaining vibration transfer functions between the engine mounting device and at least two vibration evaluation points on a vehicle body;

(c) theoretically obtaining optimum load ratios and optimum phase differences between the basic engine mounting device and the other engine mounting device on the basis of the empirically obtained transfer functions and according to vibration frequencies so that vibration level can be minimized at the vibration evaluation points;

(d) storing these theoretically obtained optimum load ratios and phase differences as a table;

(e) detecting engine speed;

(f) reading an optimum load ratio and an optimum phase difference between the basic engine mounting device and the other engine mounting device according to the detected engine speed, from the stored table;

(g) detecting a vibration load transmitted from the engine to the vehicle body via the basic engine mounting device;

(h) calculating an optimum load of the other engine mounting device on the basis of the read optimum load ratio and optimum phase difference and the detected vibration load; and (i) controlling the dynamic spring constant of the other engine mounting device to cancel vibration caused by the basic engine mounting device by that caused by the other engine mounting device at the evaluation point.

5. The method of claim 4, wherein a secondary engine speed frequency component is detected.

6. The method of claim 4, wherein the two vibration evaluation points are a steering wheel position and a floor position below a front seat.

7. The method of claim 4, wherein the theoretical load ratios and phase differences are calculated in accordance with model analysis.

* * * * *